(12) United States Patent
Reime

(10) Patent No.: US 6,208,445 B1
(45) Date of Patent: Mar. 27, 2001

(54) APPARATUS FOR WIRELESS OPTICAL TRANSMISSION OF VIDEO AND/OR AUDIO INFORMATION

(75) Inventor: Gerd Reime, Schömberg (DE)

(73) Assignee: Nokia GmbH, Bochum (DE)

(*) Notice: Subject to any disclaimer, the term of this patent is extended or adjusted under 35 U.S.C. 154(b) by 0 days.

(21) Appl. No.: 08/991,527

(22) Filed: Dec. 16, 1997

(30) Foreign Application Priority Data

Dec. 20, 1996 (DE) .............................. 196 53 582

(51) Int. Cl.⁷ .......................... H04B 10/00; H04B 10/10

(52) U.S. Cl. ...................... 359/146; 359/154; 359/145

(58) Field of Search .................. 359/184, 186, 359/145, 146, 154, 157

(56) References Cited

U.S. PATENT DOCUMENTS

| | | | |
|---|---|---|---|
| 4,621,374 | * 11/1986 | Micmic et al. | 455/603 |
| 4,882,776 | * 11/1989 | Uzawa | 455/617 |
| 4,912,524 | * 3/1990 | Nakamura | 455/608 |
| 5,053,882 | 10/1991 | Yanagidaira . | |
| 5,596,603 | * 1/1997 | Haupt | 375/242 |
| 5,926,301 | * 6/1999 | Hirt | 359/154 |

FOREIGN PATENT DOCUMENTS

| | | |
|---|---|---|
| 4202782 | 8/1992 | (DE) . |
| 4328252 | 3/1995 | (DE) . |
| 0647040 | 4/1995 | (EP) . |
| 0707391 | 4/1996 | (EP) . |

OTHER PUBLICATIONS

Mahler, Reiner: Optische Übertagung von Videosignalen, In: Fernseh– und Kino–Technik, 40, Jg., Nr. 5, 1986, S 217, 218, 220, 221.

JP 3–214882 A, In: Patents Abstracts of Japan, E–1145, Dec. 13, 1991, vol. 15, No. 494.

* cited by examiner

Primary Examiner—Jason Chan
Assistant Examiner—Agustin Bello
(74) Attorney, Agent, or Firm—Ware, Fressola, Van Der Sluys & Adolphson LLP

(57) ABSTRACT

The invention relates to an apparatus for wireless optical transmission of video and/or audio information, such as television broadcasts or video recordings, with IR radiation radiated into the surrounding free space by an optical transmitter and received by one or more photo receivers. It is the object of the invention to provide means for extending the transmission range of wireless optical transmission systems and for simplifying signal processing, so that television broadcasts or video recordings can be reliably transmitted under ambient light conditions typical in residential buildings while requiring only limited additional circuitry for matching the optical transmission channel and a small number of luminescent diodes. This object is solved in that at least for the upper frequency spectrum of the video and/or audio information, the optical transmission is based on a pulse-shaped source signal, with the information represented by the temporal position of the signal edges between pulses and non-pulse periods. A simple edge detector converts the source signal into a channel pulse signal which includes a short spike-shaped channel pulse synchronous with each signal edge in the source signal. The optical receiver includes a 1:2 frequency divider for restoring from the received channel pulse signal the original shape of the pulse-shaped source signal.

11 Claims, 4 Drawing Sheets

APPARATUS FOR WIRELESS OPTICAL TRANSMISSION OF VIDEO AND/OR AUDIO INFORMATION

TECHNICAL FIELD

The invention relates to an apparatus for wireless optical transmission and/or audio information such as television broadcasts or video recordings, which are transmitted by an optical transmitter into the surrounding free space and received by one or several photo detectors.

BACKGROUND OF THE INVENTION

The transmitter converts an electrical signal containing video and/or audio information into a signal radiation which is preferably located in the IR wavelength range. The electrical signal can be provided, for example, by an HF receiver for terrestrial or satellite television broadcast, a video recorder, an audio and/or video disc player or a video camera. In the photo receiver, an optical sensor converts the signal radiation back into the electrical signal form of the transmitter; the photo receiver is preferably connected to or housed in a playback unit for video and/or audio. Playback units are, for example, flat panel displays, video projectors, or audio systems which are located remote from the video playback unit. A conventional television set or a set top box can also be connected to a photo receiver.

Advances in television technology have led to improvements in the video and audio playback with the goal to approach the playback quality of large screen movies with multichannel audio recording. Television sets have also been combined with devices for other media, such as, for example, with a PC, a telephone network, and a video disc player for, for example, a CD-ROM, CD-i and Video-CD which will be referred to hereinafter as Video-CD.

This necessitates novel video and audio playback units, for example, flat panel displays which are advantageously located remote from the other devices.

The advantages of a flat panel display which can be hung on a wall, can hardly be exploited if this display is combined with a conventional television receiver to form a single unit to which a plurality of cables is connected.

Moreover, video disk players are generally designed to play several types of CD's, and provide playback signals for the display of a TV set as well as for an audio system. It is therefore desirable to employ wireless signal connections for transmitting video and audio information between these devices.

A method and a device for wireless optical transmission of audio information in the form of digital audio data to a wireless headset via IR radiation is known, for example, from DE-C2-43 28 252. The signal source is a digital audio source, such as a CD player, DAT recorder or a DSR tuner. The audio data are sampled values of stereo audio signals, each with a 16 bit word length, and reflect the digital source encoding used during recording. Before the data are transmitted with the IR radiation, an encoder converts the audio data into a serially channel-encoded data signal. Additional bits and data words are added to the data stream for synchronizing the receiver and for error correction. This requires a data transmission rate of about 2 Mbit/s.

The audio data are extracted from a serial digital audio interface according to the interface standard (DIN EN 60958, IEC 958). The sampled values are thus available in form of a Biphase-Mark-Code (BM-Code). An additional decoding step is required before conversion into the channel-coded data signal, which increases the complexity of the circuit. Disadvantageously, the additional encoding and decoding required in order to match the properties of an IR channel significantly increases the complexity of the additional circuitry on both the transmitter side and the receiver side, without improving transmission quality.

It is a further disadvantage that a significant amount of electrical power is required on the transmitter side for generating sufficient radiating power for a reliable transmission.

U.S. Pat. No. 5,053,882 describes the transmission of a composite FM signal containing video and audio information, wherein an analog laser video player is connected to a photo receiver through a glass fiber cable. In the laser video player, the sampled signal is converted by a laser diode into IR radiation, bypassing a customary FM demodulator, with the signal form of the IR radiation resembling the recorded signal on the Video-CD. The video signal and the audio signals are regenerated from the transmitted signal on the receiver side with the help of filters and FM demodulators. Circuitry known from the laser video player can advantageously be used for this purpose. This significantly reduces the cost for matching the FM signal to the glass fiber cable. U.S. Pat. No. 5,053,882, however, does not provide a feasible solution for wireless transmission of a television signal to spatially remote photo receivers.

Conventional luminescent diodes (IRED) are inexpensive in comparison to laser diodes and radiate IR radiation over a wide angle. This is particularly advantageous for the intended application. Disadvantageously, however, only special types of diodes can be modulated with frequencies of 10 MHz and above; in addition, these diodes emit only a small amount of radiation at high frequencies as a result of the amplitude-frequency characteristics.

Another problem is obstruction by people or by articles of furniture as well as unmodulated ambient light or ambient light modulated at low frequencies, which is commonly present in the transmission space and which is superimposed on the signal radiation as a spurious signal. Both have the effect that on the receiver side, only a small amount of radiation is available, which is difficult to process, especially over a large signal frequency range, when ambient light is present, requiring steep filters and equalizers. For this reason, conventional systems employ many luminescent diodes in parallel in order to improve the radiation yield. This arrangement, however, is limited at higher modulation frequencies due to the frequency dependent self-impedance of the diodes.

SUMMARY OF THE INVENTION

It is therefore an object of the invention to provide means for increasing the bandwidth of a wireless optical transmission system and for simplifying the signal regeneration, so that television broadcasts or video recordings can be transmitted reliably under ambient light conditions commonly found in living rooms, requiring at most minor equipment changes for matching the optical transmission channel and operating with a small number of luminescent diodes. The optical transmitter should emit over a wide angle, so that the signal radiation can be processed simultaneously by several spatially separated photo receivers.

The solution of the object is based on using a pulse-shaped source signal at least for transmitting the upper frequency spectrum of the video and/or audio information wherein the information is represented by the temporal position of the signal edges between pulses and non-pulse periods. A simple edge detector converts the source signal into a pulse-distance modulated channel pulse signal which includes in synchronism with each signal edge in the source signal, i.e. with each L/H and each H/L change, a short spike-shaped channel pulse. As a result, the available energy is concentrated—without a loss of information—into short and energetic radiation pulses with a large ratio of period duration to pulse duration, thereby increasing the emitted radiation. The pulse-shaped source signal is, for example, provided by a converter of a video disc player in form of an EFM signal or can be obtained by simple means from the frequency-modulated playback signal of a video recorder. Advantageously, the signal processors of the playback devices do not require information about the playback signal in order to regenerate the playback signal if a pulse or a pause between pulses is incorporated in the source signal. The information is recognized exclusively from the temporal position indicating a transition between different states on the recording track. These transitions can be transmitted without loss of information by using the pulse-distance modulated signal instead of the source signal. The luminescent diodes can then advantageously be operated with a signal peak current which is many times higher than the peak current used with conventional solutions, resulting in an instantaneous radiating power which is also many times higher.

Consequently, it is feasible to employ luminescent diodes with a smaller active chip area which exhibit a high efficiency at the required modulation frequencies as a result of the smaller self-capacity. On the other hand, the peak power of the optical transmitter is significantly increased over conventional solutions, while the required average energy remains unchanged. This enables the photo receiver to better recognize the optical signal and to even receive the signal indirectly. In the photo receiver, there is provided a 1:2 frequency divider for converting the received channel pulse signal into the original pulse-shaped source signal. As opposed to the solution known from DE-4328252, the present solution according to the invention does not require a special signal processor for the optical transmission channel on the receiver side. Instead, a signal processor of a type known in the art to be suitable for such signal sources is employed. Consequently, this decoder or demodulator, respectively, which includes the respective error correction device, is a conventional component used in video disc players or video recorders. It provides the advantage that the optical transmission channel becomes part of the error correction of the recording media, requiring only few additional circuit elements, and that the unit can be mass produced at very low cost.

BRIEF DESCRIPTION OF THE DRAWINGS

The invention will be described hereinafter with reference to several embodiments. In the accompanying drawing there is shown in.

BEST MODE FOR CARRYING OUT THE INVENTION

Figure 1:
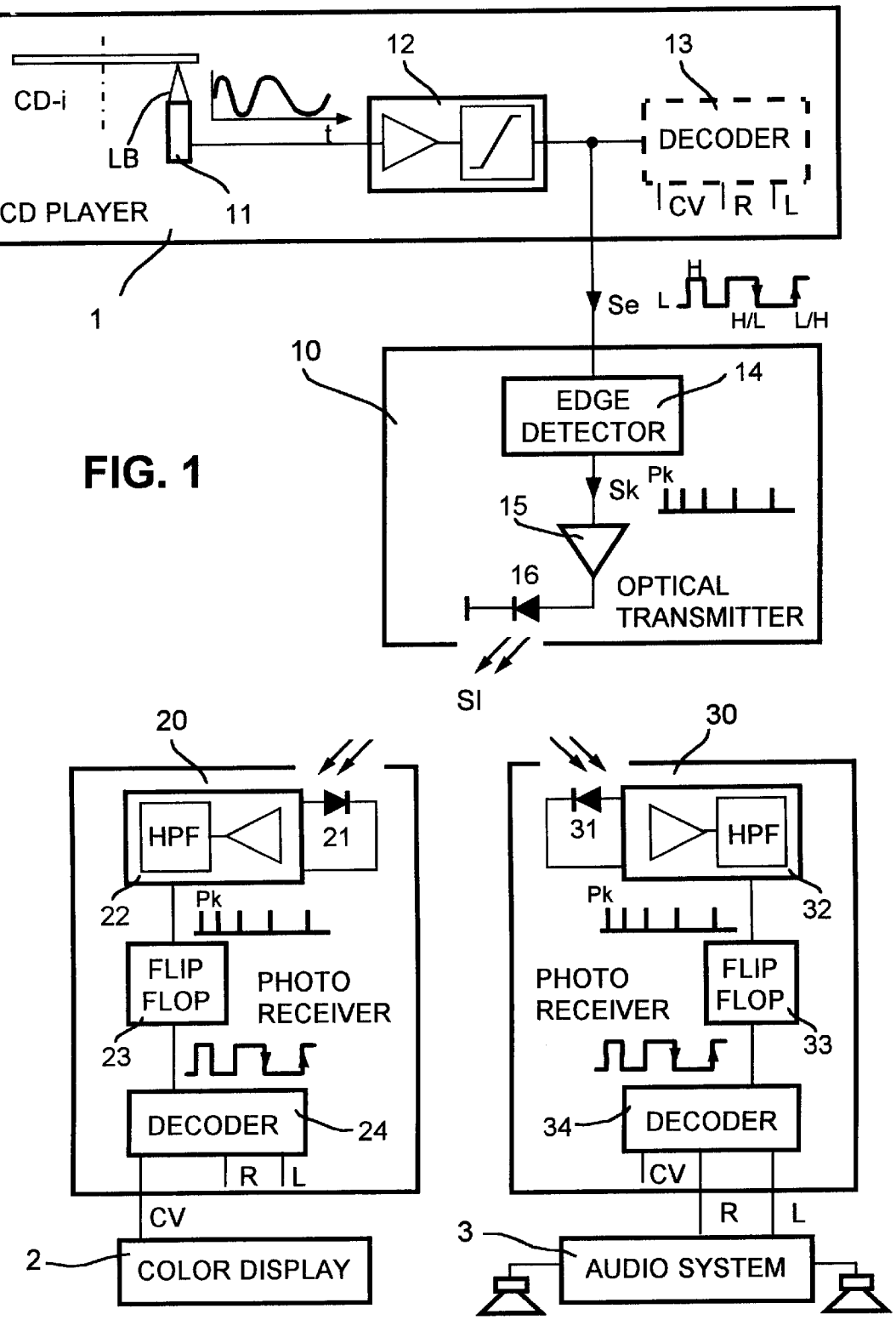
FIG. 1—a first embodiment of the invention with a CD player as signal source.
Figure 2A:
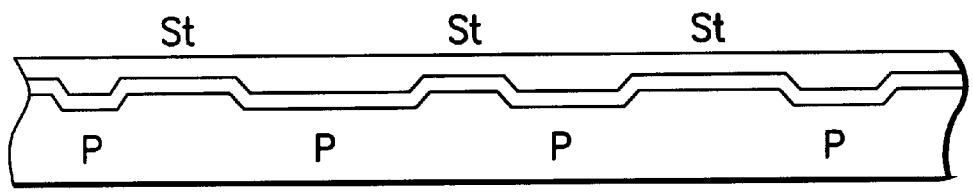
FIGS. 2a–2d are signal forms relating to selected steps of the signal recovery in the embodiment of FIG. 1, FIG. 3—a circuit for an edge detector and accompanying waveforms a–g, FIGS. 3a–3g—signal forms relating to selected components of the edge detector in the embodiment of FIG. 3, and FIG. 4—a second embodiment of the invention with a video recorder as signal source.

Referring now to FIG. 1, there is shown in a first embodiment of the invention a CD player 1 for audio CD's and CD-i connected to an optical transmitter 10. The CD player 1 supplies an encoded source signal Se, which for a CD-i generally includes data of a video signal CV and two audio signals R and L, and for an audio CD two audio signals R and L. The recording method is generally identical for both CD types. A CD-i, for example, contains the video signal CV, the audio signals R and L, sub-code data, and the synchronizing data in a single pit track PL. Before the CD-i is pressed, the video signal CV and the audio signals R and L are encoded, the data are compressed and combined in multiplexers with sub-code data for error recognition and error correction and with synchronizing data to form a serial data stream. The data stream is converted in a conventional EFM processor (EFM: eighteen-to-fourteen modulation) into the source signal Se and, as shown in FIG. 2(a), recorded on the CD with pits P and lands St. The information is exclusively characterized by the spatial specialization of the pit-land and land-pit transitions, respectively, so that even if the pits P and lands St were interchanged, the recording is still decoded properly during playback.

Figure 2B:
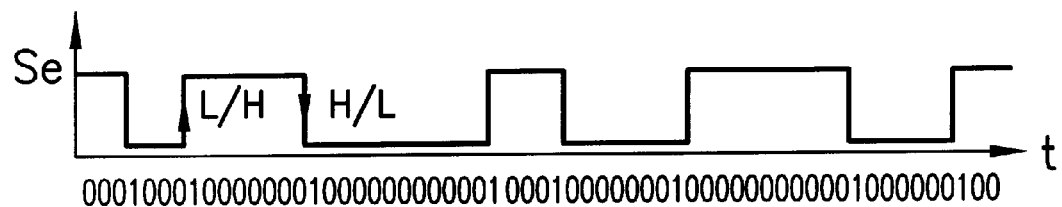
Figure 2C:
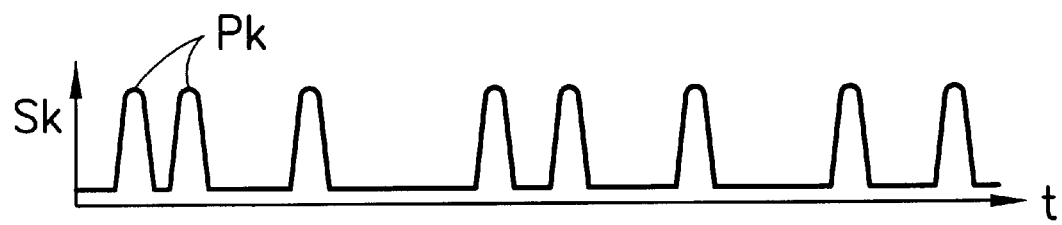

An optoelectronic converter 11 in CD player 1 reads the pit track using a laser beam LB and regenerates the source signals recorded in form of EFM which corresponds to the original signal, except for variations in the amplitude and for distortions of the signal edges. From this signal, a head amplifier 12 retrieves a control signal for controlling a converter (not shown) and—in addition—devises the decoding steps by amplifying and limiting the signal. At the output of the head amplifier 12, there is provided the source signal Se exhibiting the steep signal edges depicted in FIG. 2(b). The circuit shown hitherto is known from conventional CD players. The head amplifier 12 is commonly followed by a decoder 13 outlined in FIG. 1 as dotted lines and including means for decoding, for synchronization, for error correction and analog/digital conversion. With the present solution, however, the decoder 13 is not required for regenerating the video and/or audio information; on the contrary, the decoder 13 utilizes exclusively the sub-code and synchronization data for regenerating signals for the control of the drive and converter movements of the CD player, for example during seek times. The optical transmitter 10 is connected to the output of the head amplifier 12. The transmitter 10 includes an edge detector 14 for converting the source signals Se into the channel pulse signals Sk. As illustrated in FIG. 2(c), the edge detector 14 generates a spike-shaped channel pulse Pk in synchronism with each signal edge of the source signals Se and independent of the direction of the signal edge, so that the channel pulse signal Ck contains twice the number of pulses as the source signal Se. The ratio of the non-pulse period duration to the pulse duration for the channel pulse signal Sk is several times larger than the same ratio for the source signal Se. A driver amplifier 15 controls a luminescent diode 16 using the amplified channel pulse signal Sk. The diode radiates IR radiation Sl modulated with the channel pulse signal Sk into the surrounding free space. A first portion of the IR radiation Sl is received, either directly or through reflections at, for example, the walls or the ceiling of the playback room, by a photo receiver 20 connected to a video playback device, such as a color display 2, whereas a second portion is received a photo receiver 30 connected to an audio system 3.

With the solution of the invention, the emitted IR radiation Sl has a high intensity. Consequently, a direct optical path between the transmitter 10 and the photo receivers 20 and 30 is not required. During experiments, even IR radiation Sl which was aimed at a floor covering made of fabric, could be measured error free in reflection.

Figure 2D:
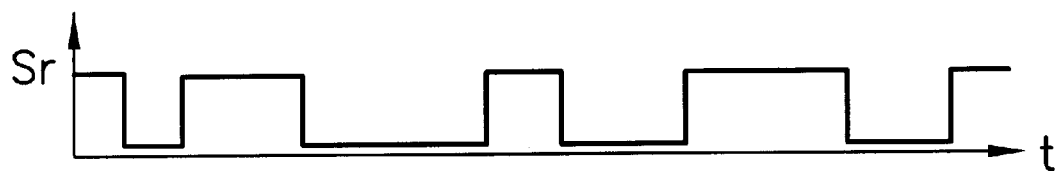

The photo receivers 20 and 30 include sensors 21, 31. These sensors 21, 31 convert the received IR radiation Sl back into an electric signal corresponding to the channel pulse signal Sk. Selective input amplifiers 22, 32 with band path or high path characteristics, separate the high frequency channel pulse signal Sk from the spurious voltage picked up by the sensors 21, 31 caused by low frequency or unmodulated ambient light. The received channel pulse signals is converted back into the form of the transmitter-side source signal Se by a respective flip-flop 23, 33. The flip-flops 23, 33 divide the channel pulse signals by a factor 2, thereby generating a received signal Sr depicted in FIG. 2(d) which corresponds to the original digitally encoded source signal Se. Each of the outputs of the flip-flop 23, 33 is connected to a respective digital decoder 24, 34 known in the art from CD players, which have the same design as the decoder 13 and which include the aforementioned means for signal regeneration for reproducing the video signal CV and the audio signals R and L, respectively. Decoders of this type are manufactured in great numbers and are therefore inexpensive. The component group can also be matched to the subsequent playback unit. For example, a RGB output or a surround processor can be added.

Figure 3:
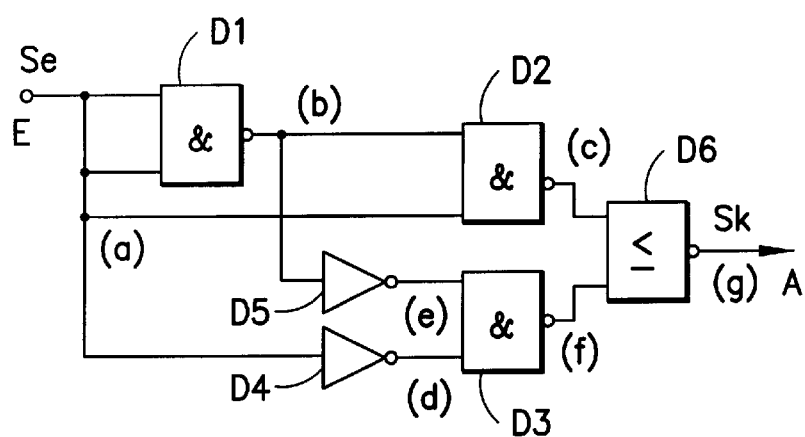
Figure 3A:
Figure 3B:
Figure 3C:

Referring now to FIG. 3, there is shown an example of a circuit for the edge detector 14. The edge detector has a data input E receiving the digitally decoded source signal Se depicted in FIG. 3(a). With the help of a delay circuit D1, the source signal is delayed by a time dt in the order of about 100 ns and inverted. The delay circuit is implemented in form of a NAND Gate D1 connected as an inverter. A first of two inputs of the second NAND gate D2 is connected directly to the data input E, whereas the other input is connected to the output of the delay circuit D1. As illustrated in FIGS. 3(a) and 3(b), both inputs of the NAND gate D1 are always at the potential H for a duration dt, when the source signal Se changes from L to H. As shown in FIG. 3(c), the output signal of the NAND gate D2 changes from H to L for a duration dt after each L/H transition of the source signal Se.

Figure 3D:
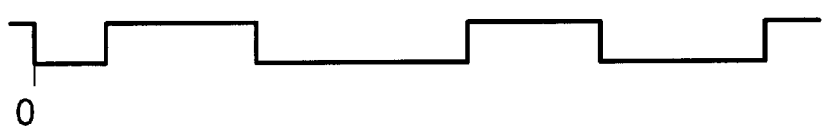
Figure 3E:
Figure 3F:
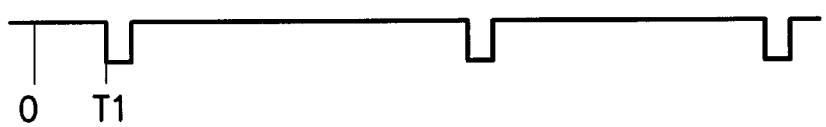
Figure 3G:
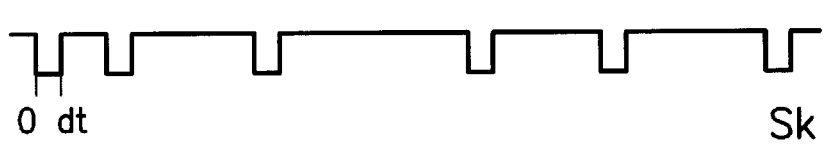

A first input of an additional NAND gate D3 having two inputs is connected to the data input E via a second inverter D4, whereas the other input is also connected via an inverter D5 to the output of the delay circuit D1. As illustrated in FIGS. 3(d) and 3(e), at any time when the source signal Se changes from H to L, both inputs of the NAND gate D3 are at H for the duration dt. Consequently, at the output of NAND gate D3 there is present a pulse signal which for the duration dt changes to L after each H/L change of the source signal Se, while remaining at H during the rest of the time, as shown in FIG. 3(f). Each of the outputs of the two NAND gates D2, D3 are connected with respective inputs of a NOR gate D6 which generates at the output A the desired channel pulse signal Sk shown in FIG. 3(g).

Figure 4:
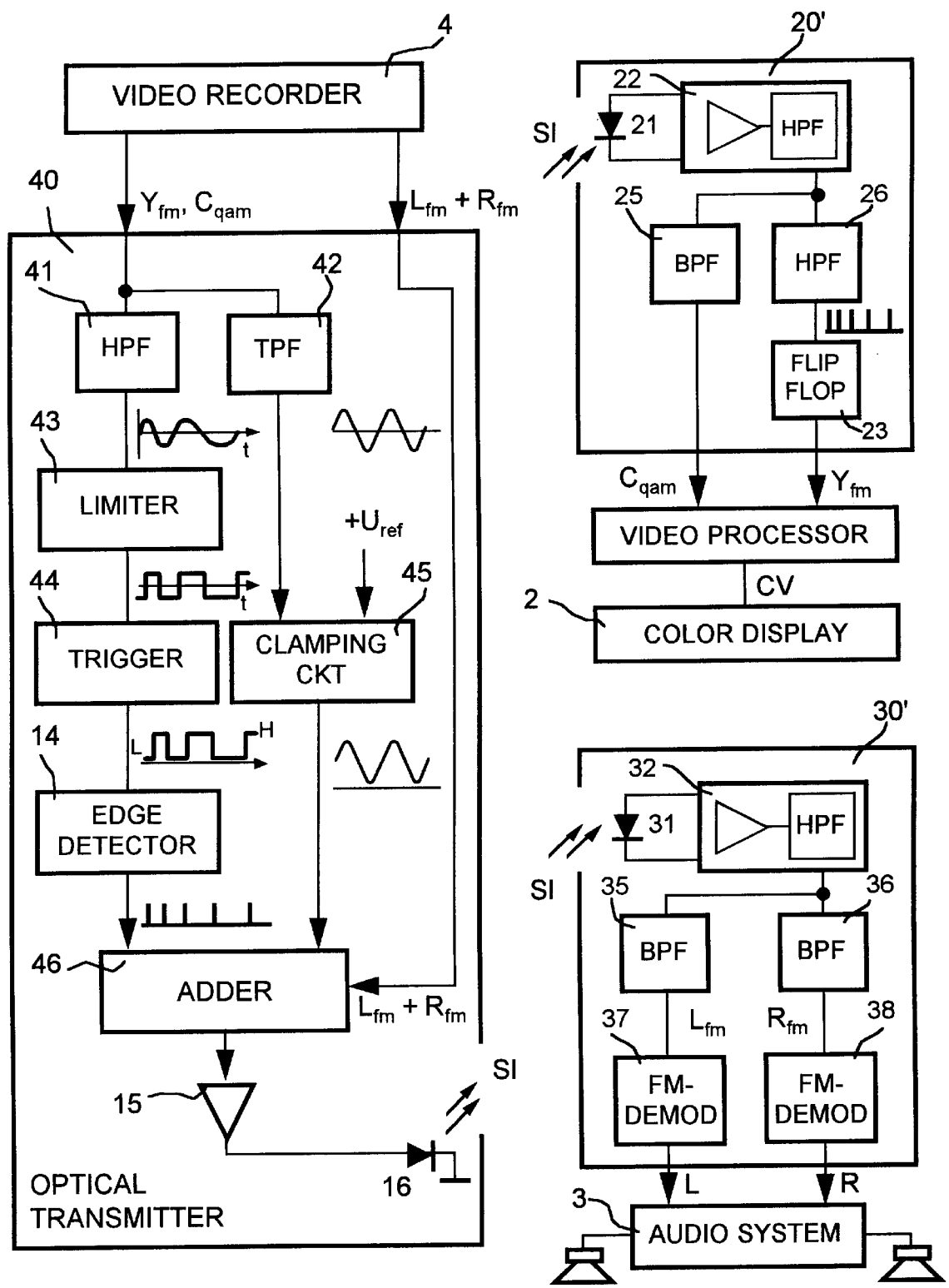

Another embodiment of the invention is shown in FIG. 4. An optical transmitter 40 generates a channel pulse signal Sk containing two analog source signals which are the playback signals of a conventional video recorder 4 with a hi-fi audio portion. A video head amplifier (not shown) supplies in playback mode a first analog source signal in form of a composite video signal. This video signal contains a FM luminance signal $Y_{fm}$ with a frequency swing between 3.8 and 4.8 MHz as well as a chrominance signal $C_{qam}$, which lies below the FM luminance signal $Y_{fm}$. In addition, the video head amplifier supplies a second analog source signal which carries the audio signals $R_{fm}$ and $L_{fm}$ in form of frequency-multiplexed signals and is located in the low energy region of the lower side band of the FM luminance signal $Y_{fm}$. The composite video signal is separated with the help of the high path filter 41 and a low path filter 42 into one branch for the FM luminance signal $Y_{fm}$ and another branch for the chrominance signal $C_{qam}$. The FM luminance signal $Y_{fm}$ passes through a limiter circuit 43 where the signal $Y_{fm}$ is first converted into a symmetric square wave and subsequently by a trigger circuit 44 into a pulse signal which only contains the level H and L.

An edge detector 14 known from FIG. 1, converts the pulse shaped luminance signal into a pulse-distance modulated signal depicted in FIG. 2(c). The potential of the chrominance signal $C_{qam}$ is shifted in a clamping circuit 45 such as to vary only between zero and a maximum value. An adder 46 superimposes the pulse-shaped luminance signal $Y_{fm}$ from the output of the edge detector 14 and the frequency-multiplexed signal with the chrominance signal $C_{qam}$ from the output of the clamping circuit 45. The resulting signal is a composite signal in form of a oscillating DC voltage which, in contrast to the recording of a video recorder, contains, on one hand, the luminance signal $Y_{fm}$ with high energy pulses and a small ratio of pulse duration to period duration and, on the other hand, the chrominance information as well as audio information. Similar to the embodiment of FIG. 1, a driver amplifier 15 is connected to the output of the edge detector 14 for controlling a luminescent diode 16 with the composite signal. The IR radiation, which is modulated with the FM luminescence signal $Y_{fm}$, the chrominance signal, and the two audio signals, is here radiated into the surrounding free space. On the receiver side, the sensors 21, 31 convert the received portion of the IR radiation back into an electric signal which corresponds to the composite signal on the transmitter side. After optoelectronic conversion, selective input amplifiers 22, 32 with high path characteristics separate the high frequency spectrum of the composite signal from the spurious voltage which is generated by the sensors due to the presence of low frequency or unmodulated ambient light. In contrast to the embodiment of FIG. 1, there is connected to the output of the input amplifier 22 in the photo receiver 20' a band path filter 25 for selecting the chrominance signal $C_{qam}$ and a high path filter 26 for selecting the luminance signal. The flip-flop 23 divides the number of pulses of the pulse-shaped luminance signal by 2 similar to the embodiment of FIG. 1. The signals $Y_{fm}$ and $C_{qam}$ present at the output of the bandwidth filter 25 and the flip-flops 23 correspond to the signals supplied by the head amplifier of the conventional video recorder during playback. Advantageously, the additional signal conditioning for the video playback portion 2 is performed with a conventional video processor used in video recorders which is mass-produced and therefore inexpensive.

The photo receiver 30' includes a band path filters 35 and 36 for separating the FM audio signals $L_{fm}$ and $R_{fm}$ as well as frequency demodulators 37 and 28 for demodulating the audio signals. These devices are comprised of conventional audio processors for Hi-fi video recorders and can therefore also be mass-produced at low cost.

The signal processors used in video recorders contain correction means for correcting transmission errors like frequency response and delay time errors. Consequently, this embodiment of the invention also includes signal regeneration in the optical transmission.

The object of the invention is not restricted to the two illustrated examples, but can also used for other signal sources. For example, a composite color picture signal of a television receiver can be converted according to the invention into an FM luminance signal $Y_{fm}$ and into a quadrature amplitude modulated chrominance signal $C_{qam}$ by using a common video processor known from conventional video recorders. The frequency spectrum of the chrominance signal $C_{qam}$ is arranged below the carrier of the FM luminance signal $Y_{fm}$. The audio signals L and R are frequency modulated likewise by using an audio processor known from conventional video recorders, and transmitted with the transmitter 40 depicted in FIG. 4.

With optical transmission systems, there is no cross talk between adjacent helical tracks as is the case with magnetic tape, nor is the transmission bandwidth limited by the tape material. It is therefore advantageous to eliminate some of the measures which are incorporated in the VHS standard and to change some of the parameters used therein. For example, in order to obtain an image of sufficient quality, the frequency band for transmitting the FM luminance signal $Y_{fm}$ has to be shifted to a higher frequency range, similar to the S-VHS standard. Since cross talk does not occur, it is also possible to do away with the phase rotation commonly used in video recorders for the chrominance carrier. Consequently, the comb filter is also eliminated.

As discussed above, the information in video recording devices is recorded with a signal form dependent on the respective recording medium. As a result, different signal processors are required for regenerating the playback signal, such as the aforedescribed decoder 13 for the Video-CD, and the aforementioned video processor for demodulation with video tape. For this reason, in a particular embodiment of the invention, different decoders and demodulators are connected to the output of photo receivers 20, 30. The decoders and demodulators then actuate in accordance with the signal form a selection unit which independently recognizes the type of the active video source based on the received signal radiation IR.

Moreover, the object of the invention can be advantageously used also for exclusively transmitting audio signals.

What is claimed is:

1. An apparatus for wireless optical transmission of video and/or audio information with a signal source (1,4) which supplies at least one pulse-shaped source signal (Se) denoting the video and/or audio information through the temporal position of rising and falling signal edges (H/L, L/H) between pulses and non-pulse periods, wherein the source signal (Se) is converted by a signal processor (24, 34, 37, 38) which is specific to the type of the signal source (1, 4) into a playback signal (CV, L, R) for a video and/or audio playback unit (2, 3), with a source signal converter for converting the source signal (Se) into a channel pulse signal (Sk), with at least one luminescent diode (16) for radiating a signal radiation (Sl) which is at least modulated with the channel pulse signal (Sk), into the surrounding free space, and with at least one photo receiver (20, 30) comprising means (23, 24, 33, 34, 37, 38) for recovering the video and/or audio information contained in the received signal radiation (Sl), characterized in that the source signal converter includes an edge detector (14) for generating a channel pulse signal (Sk) provided at each rising and falling signal edge (H/L, L/H) of the source signal (Se) with a channel pulse (Pk) which is several times shorter than the duration of the pulses and the non-pulse periods of the source signal (Se), and that the means for recovering the video and/or audio information comprises at least a 1:2 frequency divider (23, 33) in a photo receiver (20, 30) and the signal processor (24, 34, 37, 38) specific to the type of the signal source (1,4).

2. An apparatus according to claim 1, characterized in that the optical transmitter (10) is connected to a CD player (1) comprising a head amplifier (12) to which amplifier the combined video and/or audio information is supplied in the form of a digitally encoded source signal (Se) for conversion into the channel pulse signal (Sk) and for modulating the signal radiation (Sl), and that the means (24, 34, 37, 38) for recovering the video and/or audio information of each photo receiver (20, 30) comprise a signal processor (13, 24, 34) which is known from the CD disk player system, for decoding the video and/or audio information.

3. An apparatus according to claim 1, characterized in that the pulse-shaped source signal (Se) of the signal source (1) is extracted from a conventional digital output for signal transmission in Biphase-Mark code.

4. An apparatus according to claim 1, characterized in that the signal source is a video recorder (4) with a head amplifier unit providing a first analog source signal comprised of a FM luminance signal ($Y_{fm}$) and a chrominance signal ($C_{qam}$), and a second analog source signal comprised of two FM audio signals ($L_{fm}$, $R_{fm}$), and that the signal radiation (Sl) is modulated at least with the FM luminance signal ($Y_{fm}$) converted into a channel pulse signal (Sk), wherein the FM luminance signal ($Y_{fm}$) and the chrominance signal ($C_{qam}$) in the first analog source signal are separated by a high pass filter (41) and a low pass filter (42) so that the FM luminance signal ($Y_{fm}$) can be converted by a limiter circuit (43) into a square wave and further processed by a trigger circuit (44) into a binary level pulse signal before being converted into the channel pulse signal (Sk), and the chrominance signal ($C_{qam}$) can be shifted in voltage levels by a clamping circuit (45) so as to vary only between zero and a maximum value, and wherein the channel pulse signal (k) is mixed with the shifted chrominance signal ($C_{qam}$) and the FM audio signals ($L_{fm}$, $R_{fm}$) by an adding circuit (46) prior to modulating the signal radiation (Sl).

5. An apparatus according to claim 1, characterized in that the signal radiation is modulated with a chrominance signal located below the frequency band of the FM luminance signal ($Y_{fm}$) with both the FM audio signals ($L_{fm}$, $R_{fm}$) and the FM luminance signal ($Y_{fm}$) converted into a channel pulse signal (Sk) linearly superimposed with the chrominance signal.

6. An apparatus according to claim 1, characterized in that the photo receiver (20, 30) comprises several decoders and/or demodulators for processing different signal forms and detection means for detecting the transmitted signal form and for actuating the decoder or demodulator that corresponds with the transmitted signal form.

7. An apparatus according to claim 4, wherein the photo receiver (20') further comprises a band pass filter (25) for selecting the chrominance signal ($C_{qam}$) and a high pass filter (26) for selecting the FM luminance signal ($Y_{fm}$).

8. An apparatus according to claim 4, wherein the photo receiver (30') further comprises band pass filters (35, 36) for selecting the FM audio signals ($L_{fm}$, $R_{fm}$).

9. An apparatus according to claim 1, wherein the 1:2 frequency divider comprises a flip-flop.

10. An apparatus according to claim 1, wherein the edge detector (14) uses delay time from an input to an output of a gate circuit (D1) to produce a spike-shaped pulse width for the channel pulse signal (Sk).

11. An apparatus according to claim 1, wherein the source signal (Se) contains a low frequency component ($C_{qam}$), and the source signal converter further includes a clamping circuit for processing the low frequency component of the source signal into a clamped signal, thereby bypassing the edge detector (14), and wherein the clamped signal is combined with the channel pulse signal for optical transmission.

* * * * *